US007045065B2

(12) United States Patent
Penafiel et al.

(10) Patent No.: US 7,045,065 B2
(45) Date of Patent: May 16, 2006

(54) METHOD OF REMOVING RADIOACTIVE ANTIMONY FROM WASTE STREAMS

(75) Inventors: Luis M. Penafiel, Rockville, MD (US); Pedro M. Buarque de Macedo, 6100 Highboro Dr., Bethesda, MD (US) 20817

(73) Assignees: Pedro M. Buarque de Macedo, Bethesda, MD (US); Theodore Aaron Litovitz, Annapolis, MD (US)

( * ) Notice: Subject to any disclaimer, the term of this patent is extended or adjusted under 35 U.S.C. 154(b) by 72 days.

(21) Appl. No.: 10/810,280

(22) Filed: Mar. 26, 2004

(65) Prior Publication Data

US 2006/0065603 A1 Mar. 30, 2006

(51) Int. Cl.
*C02F 1/42* (2006.01)

(52) U.S. Cl. ...................... 210/660; 210/683; 210/688; 210/912; 210/741; 210/744; 210/682

(58) Field of Classification Search ................ 210/660, 210/683, 688, 912, 741, 744, 94, 95, 682
See application file for complete search history.

(56) References Cited

U.S. PATENT DOCUMENTS 4,203,441 A * 5/1980 Theeuwes ................ 604/892.1
6,527,958 B1 * 3/2003 Carli et al. ................ 210/670

FOREIGN PATENT DOCUMENTS

JP 11216356 A * 8/1999

* cited by examiner

*Primary Examiner*—Chester T. Barry
(74) *Attorney, Agent, or Firm*—Amster, Rothstein & Ebenstein LLP

(57) ABSTRACT

A method and related apparatus for monitoring and eliminating gas build-up in an anion exchange column comprised of an anion exchange material placed within a vessel and a liquid layer comprising water contaminated by at least antimony passing through said vessel, which method comprises maintaining said anion exchange material within said liquid layer by allowing gases produced by a reaction of said liquid layer with said anion exchange material to be released from said anion exchange vessel though a valve or other gas release mechanism.

19 Claims, 5 Drawing Sheets

METHOD OF REMOVING RADIOACTIVE ANTIMONY FROM WASTE STREAMS

FIELD OF INVENTION

The present invention generally relates to a method and apparatus for removing radioactive antimony from waste streams. More particularly, the present invention relates to a method and an apparatus for monitoring and eliminating gas build up in an ion exchange column used for removing radioactive antimony from waste streams.

BACKGROUND OF INVENTION

A number of radioactive isotopes are present in cooling, operational and waste water from the daily operation of nuclear power plants and fuel rod holding tanks. While these radioactive isotopes are present in the water in very low concentrations, they are nonetheless highly radioactive and toxic to human life. Safe disposal or re-use of the contaminated water can only be conducted if a sufficient quantity of radioactive isotopes is removed to reach permissible levels.

The radioactive isotopes present in contaminated nuclear reactor water include cations and anions. The removal of radioactive cations using a porous glass cation exchanger is disclosed in my prior U.S. Pat. No. 4,469,628, entitled "Fixation By Ion Exchange of Toxic Materials In A Glass Matrix". Similarly, the removal of radioactive anions using a porous glass or charcoal anion exchanger with a chelating agent, such as silver, is disclosed in my prior U.S. Pat. No. 4,659,477, entitled "Fixation of Anionic Materials With A Complexing Agent".

Of particular interest, is the removal of radioactive anions, such as antimony (Sb), including antimony-125. Reactor waste waters have a pH close to neutral, which causes antimony to be present as a soluble anion. The removal of antimony must be accomplished in the presence of other non-radioactive anions, notably borate, which in the case of pressurized water reactors streams, is present at a concentration of about of 1000 ppm as dissolved boron. Over time, the concentration of dissolved boron can vary to be between 500 ppm to 1200 ppm of boron.

Current, attempts to remove radioactive antimony in this environment have been made using an anion exchange bed to remove the antimony in series with the other ion exchange beds presently being used to remove the other radioisotopes which are used to clean the waste water. While anion exchange beds can be effective for the removal of antimony, their cleaning capacity is generally limited to very low volumes, e.g., only 200 to 300 column-volumes, after which the antimony is re-released into solution, thus recontaminating the water. This is an unacceptable capacity, especially if one considers the disposal cost of the spent radioactive ion exchange material. Thus, the low capacity results in higher costs in the form of man-hours and disposal capacity of the used anion exchange material.

The waste processing plant of the Comanche Peak Nuclear Power Plant (Glen Rose, Tex.) has spent a substantial amount of time and resources in an effort to increase the capacity of its anion exchange beds to remove antimony-125 in particular. Unfortunately, it has failed in this effort.

Accordingly, it is an object of the present invention to overcome the shortcoming of the prior art by providing a method and apparatus to remove antimony and other hazardous and/or radioactive anions from reactor waste streams with a much higher capacity than that achieved with techniques currently employed in the industry.

These and other objects will become apparent from the foregoing description.

SUMMARY OF INVENTION

It has now been found that the above and related objects of the present invention are obtained in the form of a method and related apparatus for monitoring and eliminating gas build-up in an anion exchange column comprised of an anion exchange bed placed within a vessel. A liquid layer comprising water contaminated by at least antimony is passed through the vessel with the anion exchange bed being maintained substantially within said liquid layer. In the case of pressurized water reactors, the water is also contaminated with boron. In this arrangement, gases produced by a reaction of the liquid layer with the anion exchange bed are released from the vessel though a valve or other gas release mechanism.

In one embodiment of the invention, the anion exchange vessel is only partially filled with an ion exchange material thereby permitting the water contaminated by at least antimony to form a layer above the material. As the water is processed through the material, gas forms and accumulates above the water layer. The anion exchange vessel includes a valve to remove the gas and replace it with water in a timely manner such that a substantial portion of the anion exchange material remains under the water.

In another embodiment of the invention, the water/gas interface in the vessel is monitored. Such monitoring can be performed by a variety of different monitoring mechanisms, including, but not limited to, a transparent or substantially transparent vessel; a transparent or substantially transparent window as part of a vessel at a level to indicate the anticipated water/gas interface level; a level indicating tube; a set of electrodes which provide an electrical signal to indicate the water/gas interface level; a sonic or ultrasonic level indicator; and/or a radiation source that will transmit radiation through the walls of the vessel and provide level indication for the water/gas interface level, to name a few.

In an additional embodiment of the invention, gas formed by the reaction of the anion exchange material with the water contaminated by at least antimony is removed from the vessel. The gas may be removed from the vessel when the vessel is under positive pressure during water purification, by opening a valve in the vessel which is located above the water/gas interface level of the vessel. Alternatively, the gas may be removed from the vessel when the vessel is under negative pressure during water purification, by first sufficiently closing a valve at the exit line of the vessel for the processed water to place the vessel under positive pressure and thereafter opening a valve in the vessel which is located above the water/gas interface level of the vessel.

In another embodiment of the present invention the water/gas interface level is automatically detected and when this level drops below a predetermined level in the vessel, the gas is automatically removed from the vessel though a valve or other gas release mechanism. Automatic detection of the presence of too much gas ion the vessel may be accomplished by a set of electrodes which provide a signal to indicate if the water/gas level drops below the predetermined level. The signal may then be used to actuate an electrical valve or other gas release mechanism.

In another embodiment of the invention, the anion exchange vessel is many times larger in volume than the anion exchange material, and the initial volume of water in the vessel is at least two times the volume of the anion exchange material. The capacity of the anion exchange is at least 500 column volumes.

In another embodiment of the invention, water to be treated is introduced into the vessel at a level below the water/gas interface in the vessel.

A further improvement is to prevent the water stream to be treated from agitating the anion exchange bed.

BRIEF DESCRIPTION OF DRAWINGS

The above and related objects, features and advantages of the present invention will be more fully understood by reference to the following, detailed description of the preferred, albeit illustrative, embodiments of the present invention when taken in conjunction with the accompanying figures, wherein.

It will be appreciated by those skilled in the art that FIGS. 1–5 are for illustrative purposes only and therefore are not per scale.

DETAILED DESCRIPTION OF THE INVENTION

The present invention generally relates to a method and an apparatus for removing radioactive antimony from waste streams. More particularly, the present invention relates to a method and an apparatus for monitoring and eliminating gas build-up in an anion exchange column used for removing radioactive antimony from waste streams.

Figure 1:
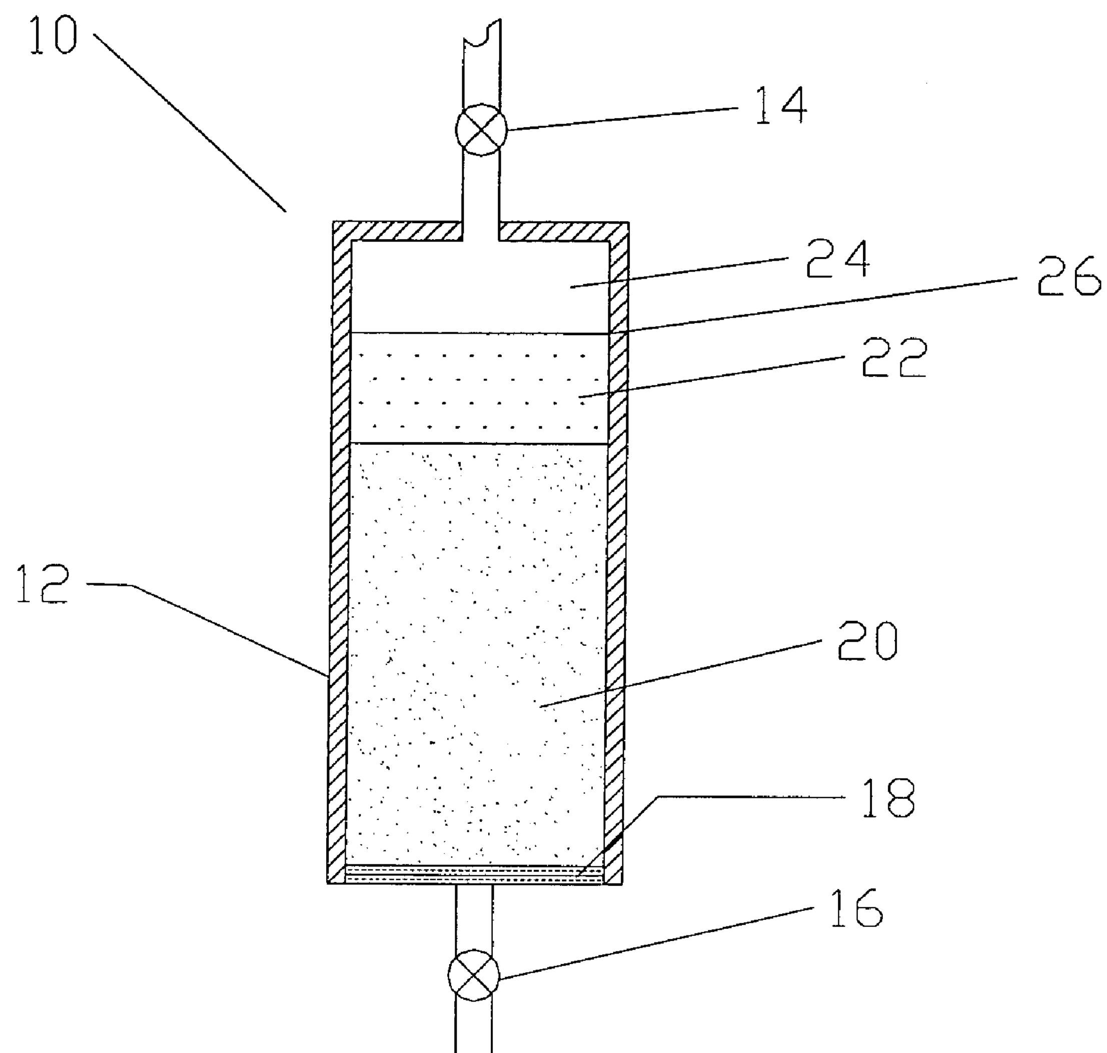
FIG. 1 is a schematic diagram of a substantially transparent anion exchange column made in accordance with the present invention.

FIG. 1 illustrates an anion exchange column 10 that is an embodiment of the invention. Anion exchange column 10 is comprised of a vessel 12 with an input valve 14 and an output valve 16. The input valve 14 in this example is a three-way valve which will allow waste water to flow in and gas to flow out of the vessel 12. Waste water to be processed is introduced into the vessel 12 through input valve 14 and removed from vessel 12 through output valve 16. In this example, a filter 18 is placed at the bottom of the interior of vessel 12, and an anion exchange material 20 suitable for removing antimony from waste water containing antimony is placed on top of the filter 18 within vessel 12. Examples of suitable anion exchange materials include AOH manufactured by Marathon, purolite A501P OH, and are well known in to those skilled in the art. During processing of waste water, the liquid 22 fills the vessel 12. During processing of waste water containing antimony-125, it has been found that the waste water reacts with the anion exchange material to form a gas 24 within the top portion of the vessel 12. If the amount of gas 24 accumulates such that the level of the liquid/gas interface 26 drops low enough in the vessel 12 such that a sufficient portion of the anion exchange material 20 is exposed to the gas 24, the anion exchange column 10 will cease to operate properly. Preferably, the liquid/gas interface 26 will not drop below the top surface of the anion exchange material 20.

The present invention solves this unanticipated problem by equipping vessel 12 with a mechanism for monitoring gas levels in the vessel 12 and a mechanism for releasing gas from the vessel 12 in a controlled manner.

Figure 2:
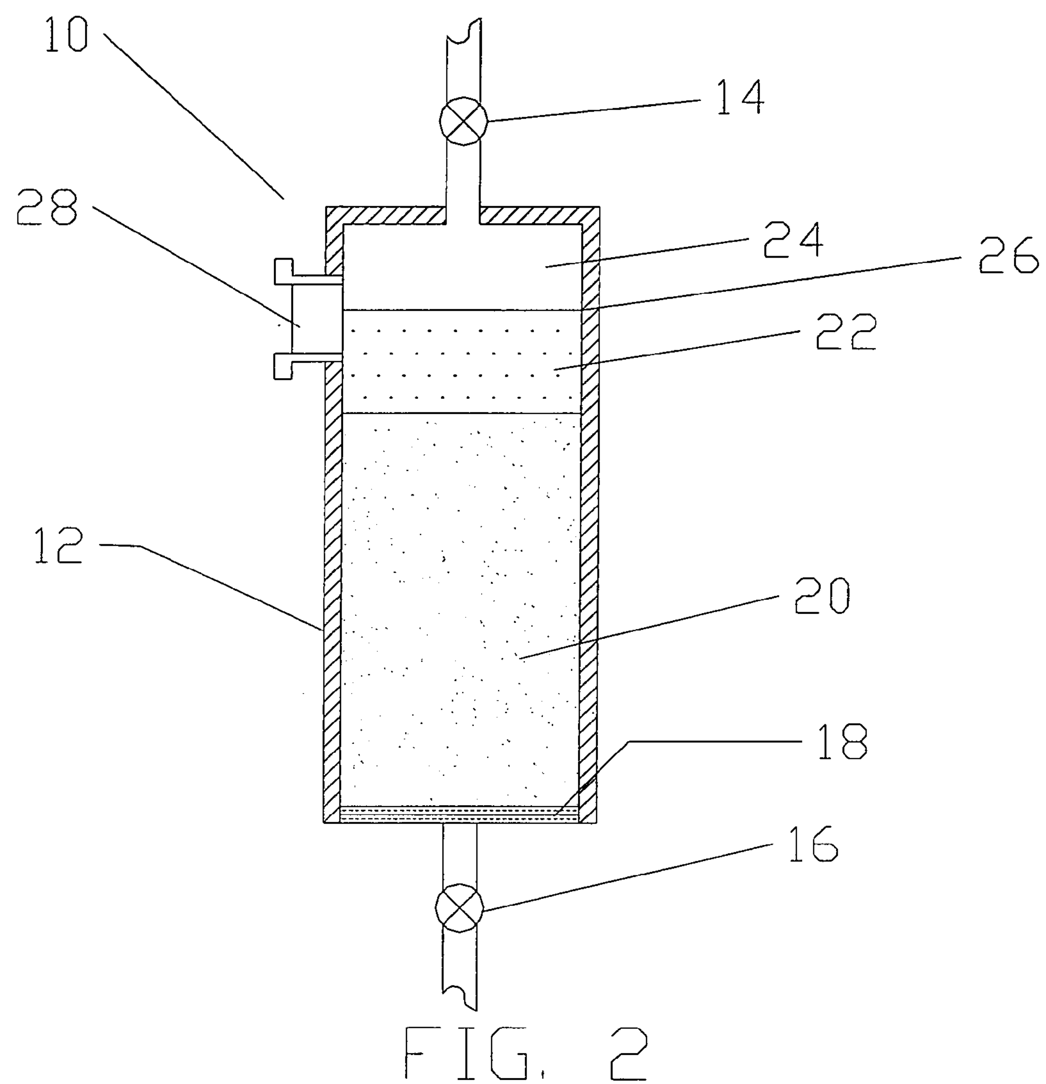
FIG. 2 is a schematic diagram of an anion exchange column containing a window made in accordance with the present invention.
Figure 3:
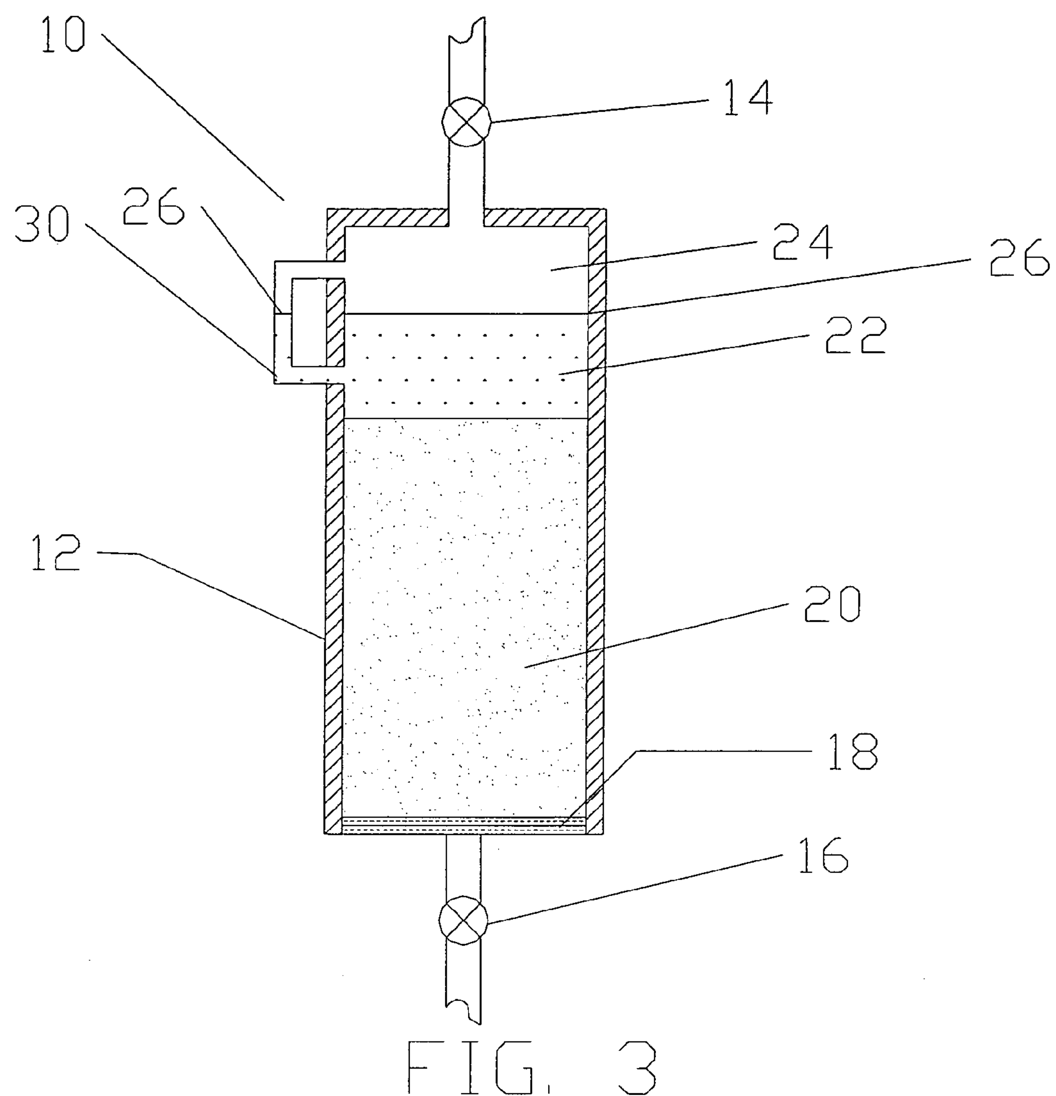
FIG. 3 is a schematic diagram of an anion exchange column containing a level indication tube made in accordance with the present invention.

The monitoring mechanism may be provided in varying forms. In this regard, the function of the monitoring mechanism is to enable the column operator to monitor the level of the liquid/gas interface 26. As shown in FIG. 1, the monitoring mechanism is a transparent or substantially transparent vessel 12, such as a plastic or glass column. Another example of a monitoring mechanism useful with the present invention is the use of a transparent or substantially transparent window 28 in the vessel 12 wall such that the liquid/gas interface 26 is visible to the operator of the column, as shown in FIG. 2. A further example of a monitoring mechanism useful with the present invention is a liquid level indicator 28, as illustrated in FIG. 3. Further, other monitoring mechanisms useful with the present invention include, but are not limited to, a set of electrodes which provide an electrical signal to indicate the water/gas interface level; a sonic or ultrasonic level indicator; a radiation source that transmits radiation through the walls of the vessel to one or more radiation detectors on the other side of the vessel so as to provide level indication for the water/gas interface level; etc. It is consistent with the spirit and scope of the present invention that any type of monitoring system which will monitor whether the liquid/gas interface 26 has dropped below a predetermined level may be used.

Figure 4:
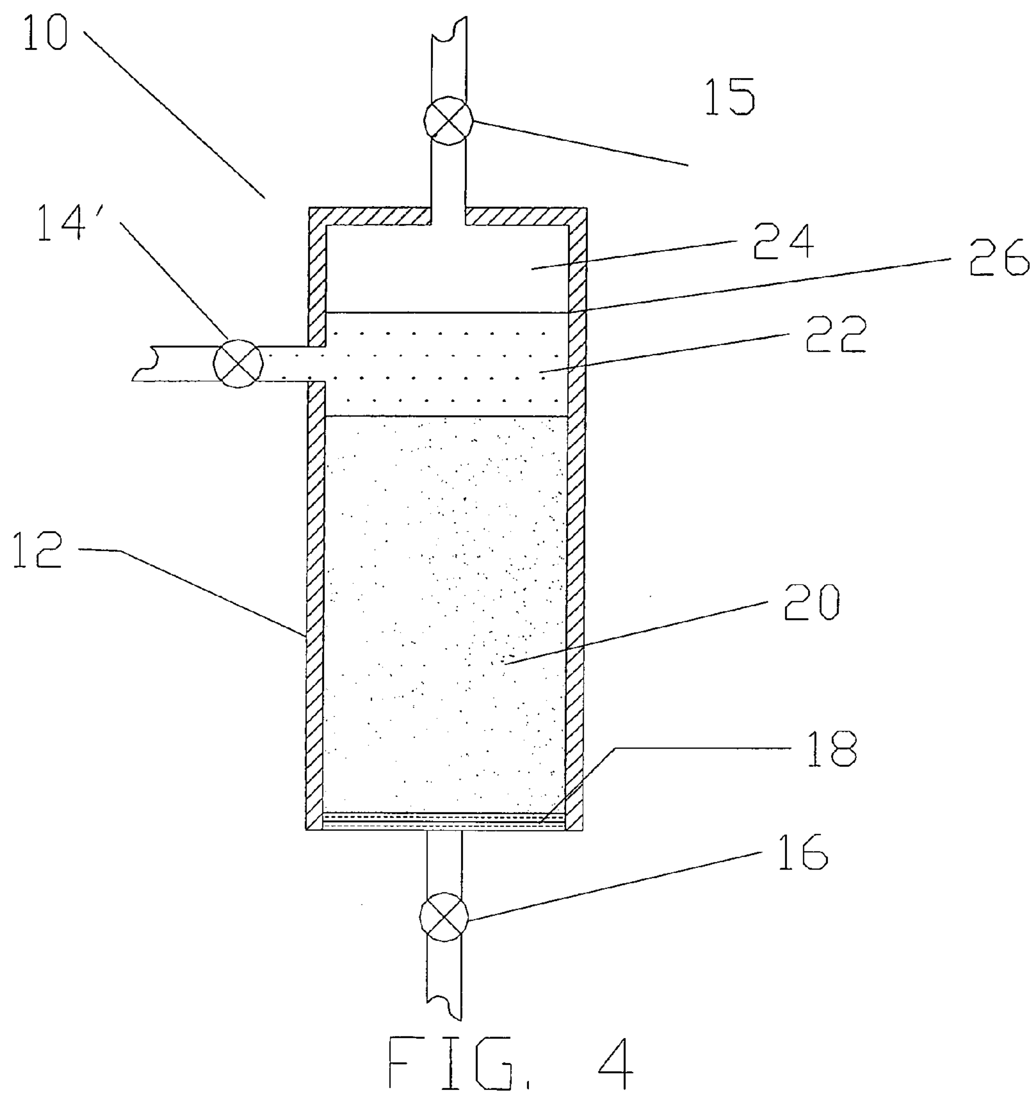
FIG. 4 is a schematic diagram of an anion exchange column having an input valve 14' below liquid/gas interface 26 and output gas valve 15 above the liquid/gas interface 26 in accordance with the present invention.

With respect to the gas release mechanism, typically a valve will be used. For example, as shown in FIG. 1, the gas build-up may be removed from the vessel when the vessel 12 is under positive pressure during water purification, by opening input valve 14 in vessel 12, which is located above the liquid/gas interface 26 level of the vessel 12. Alternatively, an output gas valve 15, as shown in FIG. 4 discussed below, can be provided in addition to an input pipe or valve. In another alternative embodiment, the gas 24 may be removed from the vessel 12 when the vessel 12 is under negative pressure during water purification, by first sufficiently closing the output valve 16 at the exit line for the processed water to place the vessel 12 under positive pressure and thereafter opening input valve 14 of vessel 12 which is located above the water/gas interface 26 level of the vessel 12. While these examples of gas release mechanisms are provided to illustrate the invention, it is consistent with the spirit and scope of the present invention that any type of gas release mechanism can be used which will enable gas build up in the vessel to be removed so as to raise the liquid/gas interface 26 above a predetermined level.

In another embodiment of the present invention, the electrodes described above is used to automatically detect the liquid/gas interface 26 level. It is noted, however, that other known or hereafter developed automated detection devices can be used. The automatic detection mechanism is connected to the gas release mechanism, so that the gas release mechanism is automatically activated when the liquid/gas interface 26 drops below a predetermined level in the vessel 12. Thus, upon reaching the predetermined level, gas 24 is automatically removed from the vessel 12. It is consistent with the spirit and scope of the present invention that any automatic detection mechanism and any gas release mechanism can be used so long as they can operate in a coordinated fashion to ensure that the liquid/gas interface 26 does not drop below a predetermined level in the vessel 12.

In another embodiment, a large enough vessel 12 is provided to accommodate gas buildup so as to increase the number of column-volumes of waste fluid to be transmitted through the anion exchange column 10 before the liquid/gas interface 26 drops below a predetermined level to insure that a sufficient portion of the anion exchange material 20 remains within the liquid 22. In particular, the anion exchange column 10 of FIG. 1 is modified so that the volume of the vessel 12 is at least twice the volume of anion exchange material 20. Preferably, the volume of the vessel 12 is at least three times the volume of anion exchange material 20. More preferably, the volume of vessel 12 is at least four times, at least five time, at least six times or most preferably at least ten times, the volume of anion exchange material 20.

By providing a larger relative volume of the vessel 12 as compared to the volume of active material, a greater capacity for gas build-up is obtained before the anion exchange material will be exposed to enough gas that the column will become effectively inoperative.

In the present invention, the capacity of anion exchange column is substantially higher than presently obtainable in commercial anion exchange columns used to remove antimony from waste water. In a preferred embodiment of the present invention a capacity of at least 500 column volumes is achieved. More preferably, a capacity of at least 600 column volumes, at least 700 column volumes, at least 800 column volumes, or most preferably at least 900 column volumes is achieved.

In another embodiment of the invention, water to be treated is introduced into vessel 12 at a level below water/gas interface 26 in vessel 12. For example, as shown in FIG. 4, the input valve 14' is located in the vessel 12 below liquid/gas interface 26, and more preferably below the top of the anion exchange material 20. By locating the input valve 14' below the liquid/gas interface 26, the incorporation of gas into the waste water being processed can be avoid. In order to ensure that the gas 24 is able to be removed from the vessel 12, in this embodiment, the output gas valve 15 is located in the vessel above the liquid/gas interface 26.

Figure 5:
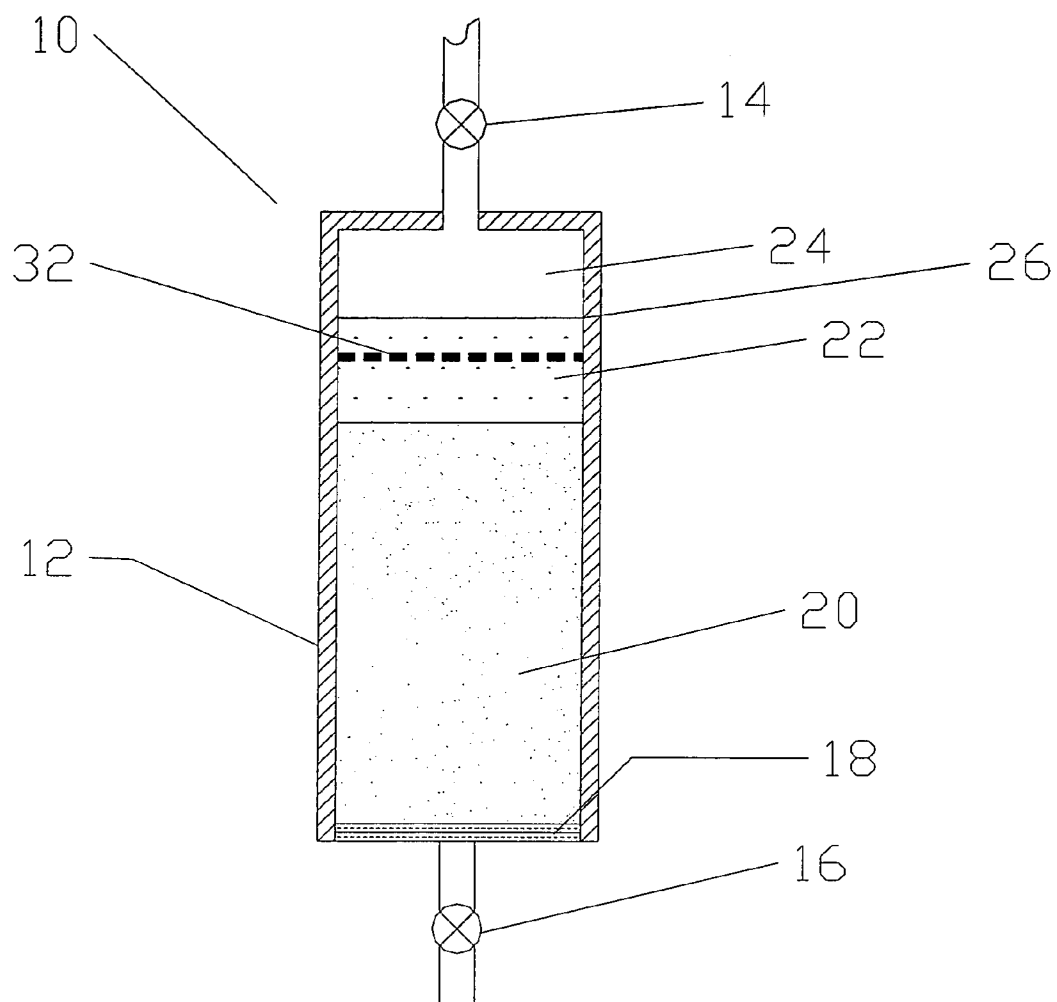
FIG. 5 is a schematic diagram of an anion exchange column having diffusion plate 32 above the anion exchange material 20 in accordance with the present invention.

An alternative embodiment of the present invention is shown in FIG. 5. This embodiment also the water stream to be treated from agitating the anion exchange material 20. In particular, a diffusion plate 32 is placed above the anion exchange material 20 and below the liquid/gas interface 26 to protect the anion exchange material 20 from being agitated by the flow of liquid entering vessel 12 through the input valve 14.

It will be understood by those skilled in the art that the foregoing method of the present invention could be modified or other methods can be used without departing from the spirit and scope of the invention.

EXAMPLE

The efficacy of the present invention is supported by the following experiment carried out in our laboratory.

Waste water from Comanche Peak Nuclear Power Plant (Glen Rose, Tex.) which included contamination by antimony-125, a radioactive anion, was passed through the same anion exchange bed used at the reactor site (AOH manufactured by Marathon). In this example, 10 ml of anion exchange material were placed within the vessel. The contaminated water was set up to flow through the vessel at a rate of approximately 60 ml/hr. In other words, a rate of 6 column volumes per hour was set up to mimic the flow conditions at the reactor site (5–10 CV/hr). Based on experience at the reactor site, the column was expected to have a capacity of between 200 and 300 column volumes (CVs). The anion exchange medium was loaded into a column which had a liquid layer of approximately 2 CVs above the exchange bed. The column was operated under positive pressure using a piston pump. As the experiment progressed, the water layer above the anion bed got progressively smaller as gas accumulated at the top of the column. Since the system was operating under pressure it was understood that the gas was being generated from within the anion exchange bed. As the gas began to build up, the normal flow of liquid was restricted by closing the output valve from the column and the gas was released by opening a three way valve located at the top of the column so that the column was both vented and connected to the liquid source. In a preferred embodiment the three way valve is a three way valve comprising a fluid input valve, an fluid output/gas input valve and a gas output valve. The normal valve configuration was restored when the gas was purged from the column. This was done periodically approximately at intervals of 50 to 100 CVs to insure that the gas did not enter into the anion exchange bed. At the time of preparation of this application, the column has been operated for approximately 900 CVs with no indication of any deterioration in cleaning effectiveness as determined by a decontamination factor for Sb-125 measured as activity in the influent divided by activity in the effluent is greater than 100. Thus, it is expected that the column could operate for even more than 900 CVs.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A method for removing antimony from waste water comprising the steps of:

passing a contaminated liquid through an anion exchange media placed within an anion exchange column;

monitoring said anion exchange column for gas build-up; and removing built-up gas from said anion exchange column.

2. The method of claim 1, further comprising the steps of partially filling said anion exchange column with said anion exchange material, wherein said waste water forms a layer above said anion exchange material.

3. The method of claim 1, further comprising the step of replacing said built-up gas with waste water, wherein said step of replacing maintains a substantial portion of said anion exchange material under said waste water.

4. The method of claim 1, further comprising the steps of:

monitoring an interface between said built-up gas and said waste water; and removing said built-up gas from said anion exchange column when said interface reaches a predetermined level.

5. The method of claim 1, wherein said step of removing built-up gas further comprises the step of applying a positive pressure to said anion exchange column by closing an exit valve in said anion exchange column.

6. The method of claim 5, said anion exchange column further comprises a gas release mechanism located above an interface between said waste water and said built-up gas.

7. The method of claim 1, wherein said step of removing built-up gas occurs automatically when an interface between said built-up gas and said waste water reaches a predetermined level.

8. The method of claim 1, wherein said anion exchange column comprises a substantially transparent vessel.

9. The method of claim 1, wherein said anion exchange column comprises a vessel with a substantially transparent window for observing an interface between said built-up gas and said waste water.

10. The method of claim 1, wherein said anion exchange column comprises a vessel with at least one electrode for determining a level of an interface between said built-up gas and said waste water in said anion exchange column.

11. The method of claim 1, wherein said anion exchange column comprises a vessel with a sonic level indicator for determining gas build-up levels in said anion exchange column.

12. The method of claim 1, wherein said anion exchange column comprises a vessel with an ultrasonic level indicator for determining gas build-up levels in said anion exchange column.

13. The method of claim 1, wherein said anion exchange column comprises a vessel and a radiation source on one side of said vessel and a radiation detector on the opposite side of said vessel, wherein said radiation source and said radiation detector are used to determining gas build-up levels in said anion exchange column.

14. The method of claim 1, wherein said anion exchange column comprises a vessel with a level indicating tube.

15. The method of claim 1, wherein the volume of waste water that can be effectively processed by said anion exchange column is at least 900 column volumes.

16. The method of claim 1, wherein said anion exchange column further comprises an intake port below an interface between said waste water and said built-up gas and a gas release mechanism above said interface.

17. The method of claim 1, wherein said anion exchange column further comprises a diffusion plate above said anion exchange material and below an interface between said waste water and said built-up gas.

18. The method of claim 1, wherein said waste water further comprises borate.

19. The method of claim 18, wherein said borate has a concentration of approximately 500–1200 ppm of boron.

* * * * *